INVENTOR
Eugene Jablonski

3,193,874
APPARATUS FOR PREPARING MOLDED ARTICLES
Eugene Jablonski, Catonsville, Md., assignor to Westinghouse Electric Corporation, Pittsburgh, Pa., a corporation of Pennsylvania
Filed July 16, 1963, Ser. No. 295,394
4 Claims. (Cl. 18—4)

This invention relates to apparatus for preparing molded articles, and in one specific aspect to an improved apparatus employing dielectric heating for the molding of articles of expanded polymeric materials.

It is known to prepare molded articles from expanded beads of a polymeric material, such as polystyrene containing an expanding agent such as pentane, by subjecting a plastic mold filled with water-coated partially pre-expanded expandable beads to a high frequency field which causes the water coating the beads to boil, which in turn heats the beads and causes their further expansion and welding together into a shape dictated by the interior of the mold.

An object of the present invention is to provide an apparatus for such type of preparation of molded articles, which is relatively simple in construction, yet constructed and arranged for such preparation in an expeditious manner and is suitable for economic preparation of job-lot quantities of molded articles as well as limited continuous production of a particular article.

In general, the apparatus of the present invention includes a frame structure which defines two stations, a load-unload station and a heat-cure station; a turntable for conveying a mold between the two stations; a high frequency oscillator and electrode press at the heat-cure station; and mold filling means as well as molded-article-ejecting means at the load-unload station. All constructed and arranged to provide for efficient trouble-free production of molded expanded bead articles.

Other features, advantages and objects of the invention will become apparent from the following detailed description when taken in connection with the accompanying drawings, in which.

Figure 1:
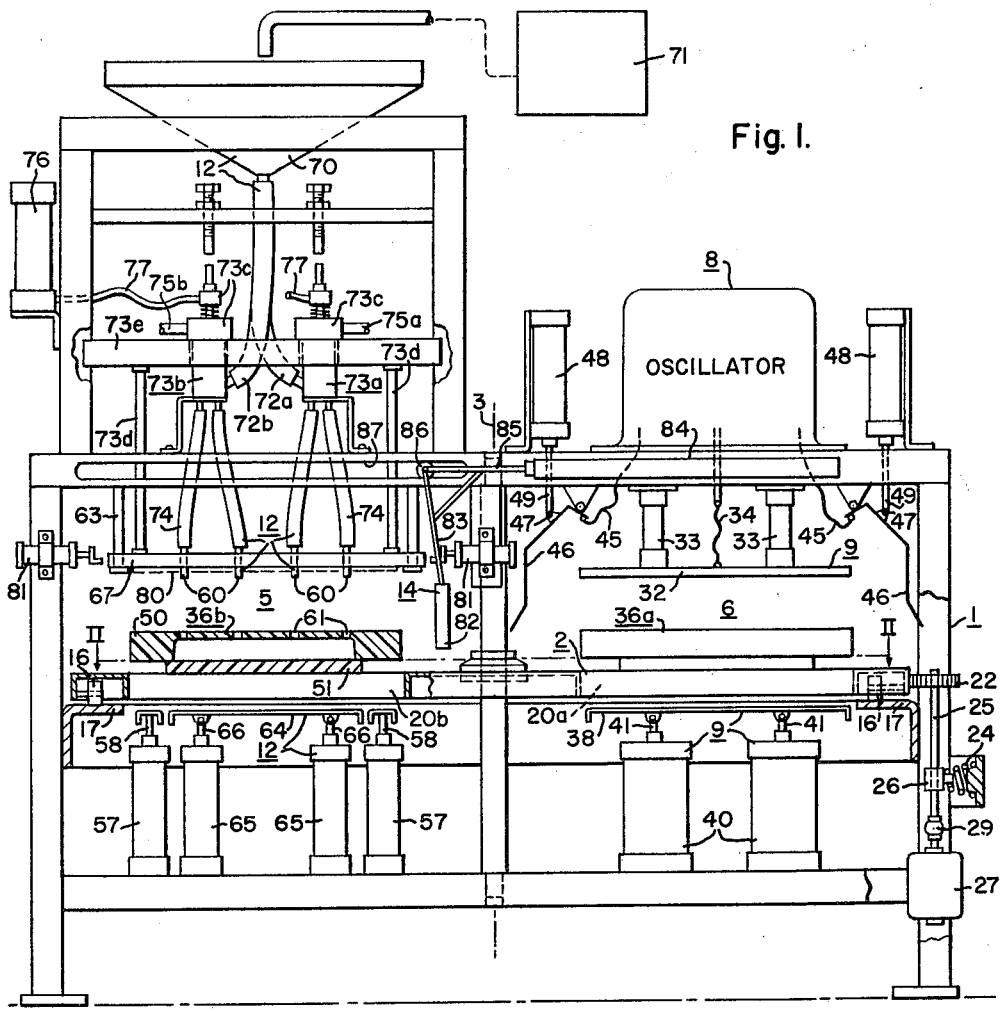
FIGURE 1 is a front elevation view of an illustrative embodiment of the apparatus.

Referring now to the drawings, the exemplified embodiment of the invention comprises a floor-supported frame structure 1 for support of the components of the apparatus; a mold-transporting horizontally-disposed turntable 2 rotatable about a vertical axis 3 through a load-unload station 5 and a heat-cure station 6 defined by the frame 1 at opposite locations on the turntable; a high frequency oscillator means 8 and electrode-press means 9 at the heat-cure station 6; and, at the load-unload station 5, a mold-filling-and-emptying means 12 and a molded-product-ejecting means 14.

The turntable 2, is supported at its outer edge by a plurality of circumferentially-spaced-apart rollers 16 (two of which are shown) riding on an annular rollerway 17 secured to the frame 1, and it has two oppositely-arranged identical vertical through openings 20a and 20b at equal distances from the axis 3 for simultaneous disposition at the two stations 5 and 6 respectively and alternately at successive intervals during intermittent rotation of the turntable 2. The turntable is driven at the required intervals through the medium of a rubber-tired friction drive wheel 22 in frictional contact with its outer edge. Frictional driving contact of wheel 22 with the turntable is maintained by a bias spring 24 exerting the required force against a drive shaft 25 on which such wheel is secured, through the medium of a sleeve bearing 26. A slow-speed motor drive assemblage 27 is drivingly connected to the shaft 25 by way of a flexible rotary coupling 29.

The oscillator means 8, including its tube, tank coil and condenser, etc. (none of which are shown) is constructed and arranged to generate a high frequency alternating field of such as 13 megacycles at a maximum of 6000 volts, for example, and is located immediately adjacent to the fixed upper plate electrode 32 of the electrode-press means 9 at the heat-cure station 6. Upper high voltage electrode 32 is supported by the frame via standoff insulators 33 and is connected to the high voltage side of the oscillator output via a high frequency conductor 34 for fixed-position disposition above molds 36a and 36b carried by the turntable over openings 20a and 20b, respectively.

The electrode-press means 9 includes a low voltage plate electrode 38 of generally rectangular or square shape of a size suitable to pass vertically through the opening 20a or 20b when each is disposed at the heat-cure station 6. Electrode 38 is actuated vertically by a fluid pressure actuator means in form of four pneumatic cylinders 40, two of which are shown, which are mounted on the frame 1 in a vertical attitude with the upper ends of their respective piston rods 41 pivotally secured to the underside of electrode 38 in support thereof. The construction and arrangement of the cylinders 40 is such that in their relaxed state, with piston rods 41 retracted, as shown in the drawings, the electrode 38 will be disposed below the level of openings 20a, 20b to avoid interfering with rotary movement of the turntable 2, and in their active or pressurized state the piston rods 41 extend to raise the electrode 38 upwardly through the opening 20a or 20b and lift the mold 36a or 36b into forceful abutting contact with the underside of the fixed electrode 32.

Electrical connection from the low voltage side of the oscillator 8 to the movable electrode 38 is obtained through the medium of flexible high frequency leads 45 and a pair of electrical contact elements 46 movable from retracted positions as shown, pivotally about pin supports 47 into abutting electrical contact with side edges of electrode 38 when in its raised mold-pressing position disposed above the top of turntable 2. Actuation of the contact elements 46 is provided for by a pair of pneumatic cylinders 48 having their piston rods 49 operatively connected to such contact elements, respectively. The cylinders 48 are double-acting and actuate the elements 46 pneumatically to their respective retracted positions in which they are shown in FIG. 1.

Figure 2:
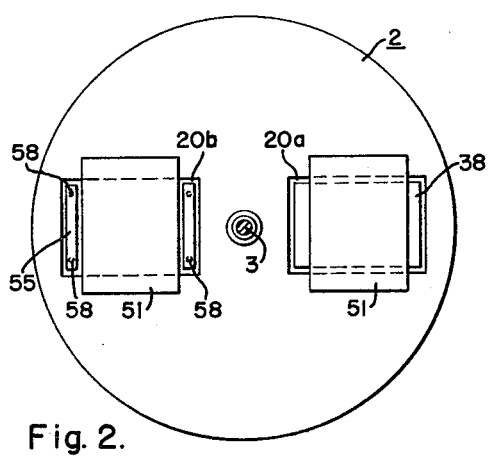
FIG. 2 is a horizontal section view taken at the line II—II in FIG. 1.

In accord with the invention as exemplified herein, the molds 36a and 36b are of two-part construction, having an upper mold part 50 and a flat lower part 51, both of generally rectangular outline. To permit the lower mold part 51 of each mold to rest on the turntable above the respective opening 20a or 20b, such lower part is longer than the respective dimension of such opening in order to span it and find support at opposite edges, as can be seen in FIG. 2. The width of the lower part 51 is less than the width of the turntable opening 20a or 20b as well as less than the width of the upper mold part 50, to permit travel of upper-mold-part-lifting elements 55, normally disposed beneath the turntable 2, past opposite edges of lower mold part 50 and into supporting engagement with underside of such upper mold part for raising same to an article-ejecting position above the lower mold part 51 to cause a plurality of fixed nozzles 60 to become projected into the interior of the upper mold part through openings 61 in its upper wall to cause ejection of the molded article (not shown) therefrom. Such vertical movement of elements 55 is accomplished by operation of a pair of pneumatic cyylinders 57 having their piston rods 58 connected to such elements.

To provide for filling the molds with the moldable material when at the load-unload station 5 after emptying the upper mold part 50, the lower mold part 51 is lifted to join the upper mold part 50 held by clamping cylinders 81 positioned with the nozzles 60 projecting through the upper mold openings 61 in readiness for introduction of such moldable material. Such lifting of the lower mold part is accomplished by a lower-mold-part-lifting plate 64 at station 5 which is normally disposed below the turnable opening and nested between upper-mold-part-lifting elements 55. Actuation of lower-mold-part-lifting plate 64 is obtained by operation of a pair of vertically-arranged pneumatic cylinders 65 having the upper ends of their piston rods 66 secured to the underside of such plate.

To provide for introducing the moldable material, such as suitably-wetted, partially-expanded, expandable beads of polystyrene, the apparatus comprises a hopper 70 into which is introduced the partially-expanded expandable beads, preferably in dry form as pre-expanded by a pre-expander apparatus 71 such as my hot air pre-expander apparatus and method disclosed in my copending United States patent application, Serial No. 281,221, filed May 17, 1963. Bead-conveying ducts 72a and 72b exit from the hopper to respective connections with a pair of bead-coating devices 73a and 73b, such as disclosed in my copending United States patent application, Serial No. 295,395, filed July 16, 1963 concurrently herewith, which coats the partially-expanded beads with a dielectrically heatable liquid while such beads are conveyed from the hopper 70 to the molds 36a, 36b in streams of compressed air via flexible mold-feed conduits 74 connected to the nozzles 60. Compressed air supply conduits 75a and 75b provide for introduction of compressed air to the bead-coating devices 73a and 73b. A reservoir 76 provides storage for the coating material, such as water containing a wetting agent, bead-coloring dyes, etc.

Operation.

Referring to FIGS. 1 and 2 in the drawings, assume initially that the various components of the apparatus are in the respective positions in which they are shown in the drawings; that the hopper 70 is filled with a supply of partially-expanded further-expandable beads of such as polystyrene containing an expanding agent such as pentane; that the reservoir 76 contains a suitable supply of dielectrically-heatable coating material for the beads, such as a mixture of tap water and a wetting agent; that a source of compressed air is available for operating the several pneumatic cylinders embodied in the apparatus as well as for operation of he bead-coating devices 73a and 73b; and that the oscillator means 8 is suitably energized from a direct current source (not shown) for producing a high frequency electrical field of such as 13 megacycles at a maximum of 6000 volts.

Assume now that it is desired to effect molding of articles of such as the exemplified expandable polystyrene beads according to the shape of the interior of the molds 36a and 36b between their upper and lower parts 50 and 51. The mold, such as mold 36b, at the load-unload station 5 is caused to be lifted by the pressurization of pneumatic cylinders 65 and the consequent raising of the mold-lifting plate 64 to an uppermost position in which the filler nozzles 60 project through the openings 61 in the upper wall of the upper mold part 50. This position is brought about first by engagement of such upper mold part 50 with a screen grid 80 which can serve to retain beads admitted to a mold of different design than that illustrated and which would be open at the top, followed by a raising of a nozzle 60 carrying frame 67 along vertical guide rods 63 to cause raising of a control element 73c in each of the bead-coating devices 73a and 73b through the medium of lift rods 73d and a vertically-movable cross member 73e to prepare devices 73a and 73b for reasons set forth in aforementioned patent application Serial No. 295,395. While the mold 36b is held by the cylinders 65 in such raised position it is filled with partially-expanded beads from the hopper 70 by way of the bead-coating devices 73a and 73b in a stream of compressed air via the nozzles 60; such partially-expanded beads becoming coated with a high loss factor material in transit through the coating devices 73a and 73b to render the beads thus introduced into the mold suitable for dielectric heating. As aforementioned, such coating material may be water mixed with a minor portion of a wetting agent which promotes uniform covering of the beads admitted to the mold.

Once the mold, 36b, for example, has thus been filled with the exemplified partially-expanded further-expandable polystyrene beads, the air is exhausted from the cylinders 65 to permit the mold 36b to be lowered onto the top of the turntable 2 by downward retraction of the mold-lifting plate 64, to the position in which it is shown in the drawings. The turntable 2 is then caused to rotate on the support rollers 16 by operation of the motor drive assemblage 27, rotary coupling 29, the drive shaft 25, and the rubber-tired friction drive wheel 22, to cause the mold 36b to be transported to the heat-cure station 6 while the mold 36a is simultaneously transported to the load-unload station 5 previously occupied by such mold 36b.

At the heat-cure station 6 the mold 36b previously filled at station 5 and now disposed at station 6 is brought into abutting contact with the electrodes 32 and 38 and clamped therebetween by operation of the cylinders 40, which effects raising of the lower electrode 38 upwardly through the opening 20a into engagement with the lower mold part 51 and thereafter causes lifting of the mold 36b into abutting engagement with the upper electrode 32 with such force, five pounds per square inch, for example, as to assure that the mold parts will be held together during the subsequent further expanding of the beads within the mold. The pair of electrical contact elements 46 are then brought into engagement with the sides of the lower electrode 38 in such raised position by operation of the cylinders 48 through the medium of the piston rods 49 which cause such electrical contact elements 46 to pivot about their respective pin supports 47 during the act of moving into sidewise engagement with the edges of the lower electrode 38. Connection between the high voltage output from the oscillator 8 and the electrodes 32 and 38 is thus established. The electrodes are subjected to a high frequency alternating potential at such as 13 megacycles and up to 6000 volts, for example, which high voltage field effects so-called dielectric heating of the coating material, such as water, on the partially-expanded beads within the mold 36b. Such dielectric heating of the coating material on the beads transfers heat energy to the beads and causes further expansion thereof while confined within the mold and results in a further expansion of the beads and a fusing together and results in an integral low-density cellular product which takes an outer shape according to the inner shape of the void within the mold. At the same time where the high loss factor coating material on the beads is volatile, such as water, such heating of the coating material results in its vaporization and tends to become driven out of the mold to escape as a steam or vapor via such as the ports 61, so that the molded article tends to become dried during the period of heating. The high frequency alternating voltage remains applied to the electrodes 32 and 38 for a period of time of from such as 3 to 30 seconds, according to properties of the material being molded, the size of the molded article, etc. Following this, the high frequency, high voltage field is cut-off to the electrodes 32 and 38 while the mold remains clamped between these electrodes for a period of time sufficient to permit cooling of the molded expanded bead article within the mold to the extent that the expansion of the beads will be completed while confined within the mold. This cooling period will usually last from 30 to 60 seconds.

Following such heating and cooling of the expanded molded beads within the mold 36b, for example, the electrical contact elements 36 will be retracted by release of compressed air from the cylinders 48 to permit the return springs (not shown) therein to effect pivotal withdrawal of such elements 46 away from the bottom electrode 38 by swinging movement thereof about the respective pins 47. At the same time or subsequent thereto the clamping force applied by the electrodes 32 and 38 on the mold 36b, for example, is relieved by downward retraction of the lower electrode 38 which is effected by release of compressed air from the cylinders 40. The mold 36b, for example, is thus lowered onto the top of the turntable 2 in a position straddling the opening 20a therein, as shown in FIG. 2, while the lower electrode 38 drops to the position in which it is shown in the drawings disposed beneath the turntable 2 below such opening.

During the time that the material within the mold 36a is being heated dielectrically and permitted to cool within the retaining influence of the electrodes 32 and 38 as above described; the mold 36b at the load-unload station 5 will have been filled with the moldable material as previously described in connection with the mold 36b, so that upon completion of molding and curing of the article within the mold 36b and its lowering onto the top of turntable 2 as described above, the turntable 2 will be rotated 180° by operation of the motor drive assemblage 27 to carry the mold 36a from the load-unload station 5 to the heat-cure station 6 and to carry the mold 36b from such station 6 to such station 5.

The newly filled mold 36a will undergo the same treatment as that described in connection with mold 36b, while the mold 36b now again at station 5 will have its upper part 50 raised above its lower part 51 by operation of the upper-mold-part-lifting elements 55 brought about by pressurization of pneumatic cylinders 57. Such raising of upper mold part 50 relative to bottom mold part 51 which will remain on the turntable 2 will carry with it the molded article within the cavity of the upper mold part. Such upward movement of the upper mold part 50 will again cause the nozzle 60 to project through the openings 61 in preparation for dislodgement of the molded article or articles within such upper mold part. Pneumatic upper-mold-part-clamping cylinders 81 are then operated to grip the upper mold part 50 and hold same suspended while the upper-mold-part-lifting elements 55 retract downwardly to their repose positions below the turntable 2. The nozzles 60 are then supplied with compressed air for ejection of the molded article onto the top of the flat lower mold part 51. Projection of the nozzles 60 into the openings 61 may assist mechanically in dislodgement of the molded article within the upper mold part 50.

While the upper mold part 50 remains in its clamped position above the turntable, the molded article resting in a random fashion on the flat lower mold part 51 is swept from the turntable 2 by operation of ejecting means 14 in the form of an elongated paddle which is carried by an arm 83 and caused to sweep across the top of the lower mold part 51 by operation of an elongated pneumatic cylinder 84 through the medium of its piston rod 85 having a suitable roller and guide 86 and 87 for its projecting end. The cylinder 85 is double-acting and its return stroke for retraction of the paddle 82 also thus is effected pneumatically.

Following ejection of the molded article from the turntable 2 the lower mold part 51 is raised by plate 64 into abutment with upper mold part 50 by supply of compressed air to the cylinders 65. Following such joining of the two mold parts by the plate 64 the upper-mold-part-clamping cylinders 81 will be released and the mold is again ready for repeat of the filling operation as previously described.

It will be understood that the apparatus embodies pneumatic valves and electrical switches for controlling operation of the various pneumatic cylinders and for controlling operation of the oscillator 8 and the motor drive assemblage 27. Such control system (not shown) provides for operation either manually or for automatic sequencing of the various functions performed by the apparatus. Such control system also embodies a limit switch means for automatically stopping the motor drive assemblage 27 at each half revolution of the rotary table 2 to assure that the molds 36a and 36b will be properly aligned with respect to the stations 5 and 6, as well as other circuitry associated with the coating devices 73a and 73b as described in my aforementioned copending application Serial No. 295,395.

Figure 3:
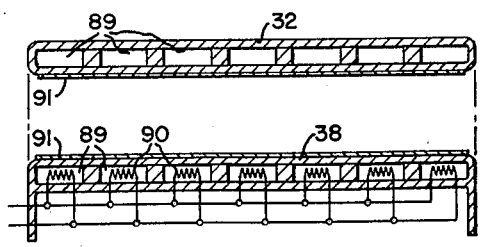
FIG. 3 is a section view of an alternate electrode structure.

The material of which the molds 36a and 36b are composed may be of a low loss factor material such as polypropylene so as to remain relatively unheated by the dielectric field to which same is subjected between the electrodes 32 and 38 during the heating phase of the operation performed by the apparatus of the present invention. On the other hand, however, in behalf of altering the surface texture of the molded article within the mold it is possible to employ a picture frame mold (not shown) in which top and bottom are open and held closed during the molding operation by electrodes which have provision for their being heated and cooled respectively during the periods of heating and cooling of the molded material within the mold. Accordingly, FIG. 3 illustrates in cross sectional elevation an alternate structure of the upper and lower electrodes 32 and 38, respectively, in which metal electrodes are provided with fluid passages through which hot water may be circulated during the heating of the molding material and through which cold water may be circulated during the cooling of the molding material. As an alternate construction the molds may be heated by way of such as resistance elements 90 disposed in the passages 89. The mold-closing surfaces of the electrodes 32 and 38 may be coated with a thin film 91 of suitable plastic to eliminate arcing and prevent sticking of the molded material on such electrodes. By virtue of this construction and technique, in addition to heating the liquid-coated mold material dielectrically throughout its mass, heat will also flow from the heated electrodes by heat conduction to its outer surfaces at its top and bottom to assure that these upper and lower surfaces of the molded article will obtain a smoothness comparable to that generally obtained in the steam molding technique where the molds are heated by steam during the molding operation. As an extension of this concept, conceivably the inner walls of the picture frame mold might also similarly be adapted for such heating and cooling.

While there have been shown and described what are at present considered to be the preferred embodiments of the invention, modifications thereto will occur to those skilled in the art. It is not desired, therefore, that the invention necessarily be limited to the specific arrangements shown and described and it is intended to cover in the appended claims all such modifications as fall within the true spirit and scope of the invention.

I claim as my invention:

1. Molding apparatus comprising a frame structure defining a load-unload station and a heat-cure station, the stations being oppositely-arranged at horizontally-separated locations; a turntable in a horizontal plane rotatable about a vertical axis fixed relative to said frame, said turntable having two vertically-through openings arranged diametrically opposite therein for disposition at the aforesaid stations, respectively; a pair of molds disposed on said turntable over said openings respectively, each mold including a lower mold part having a flat upper surface and spanning but not entirely closing the respective turntable opening and an upper mold part normally disposed on the lower mold part, said upper mold part having openings therein at its top to receive moldable material therethrough; motor drive means for rotating said turntable at 180° increments to carry the two molds consecutively and alternately to the aforesaid stations; mounted on the frame at the load-unload station: mold-filling-and-emptying means disposed above the top of said turntable, upper-mold-part-lifting means normally disposed beneath the turntable and actuable upwardly through whichever turntable opening is disposed at the load-unload station to raise the respective upper mold part above the respective lower mold part to the mold-filling-and-emptying means for emptying a molded article from such upper mold part onto the flat upper surface of such lower mold part while the upper mold part is held above the lower mold part, molded-article ejecting means actuable to sweep over said flat upper surface to facilitate removal of the article from the apparatus, lower mold part lifting means normally disposed beneath the turntable and operable upwardly through the turntable opening to raise the lower mold part into juncture with the upper mold part for filling with moldable material and retractable during concurrent ineffectuation of the upper-mold-part-lifting means to lower the filled mold in toto onto the turntable for transport to the heat-cure station while the mold-article-containing mold is simultaneously carried by the turntable from the heat-cure station to the load-unload station; and on the frame at the heat-cure station: a high frequency oscillator, an upper fixed electrode plate connected to one side of the oscillator output, a lower electrode plate normally disposed beneath the turntable and actuable vertically through one or the other of the turntable openings to force the filled mold against the upper fixed electrode and retractable downwardly to its lower position to return the mold to the turntable, electrical contact means actuable into engagement with the lower elecrode plate while in its raised position to connect same electrically to the other side of the oscillator output for dielectric heating and curing of the moldable material and retractable to free the lower electrode for lowering following such heating and curing.

2. In a molding apparatus, a frame defining a station, a horizontal turntable having an opening extending vertically therethrough and constructed and arranged for rotary movement to cause said opening to enter and leave said station, and on said frame at said station: a source of moldable material, mold filling and emptying means disposed above the turntable, a mold having a lower mold part with flat upper surface supported by the turntable in extension over said opening with horizontal clearances at opposite edges and having as upper mold part normally resting on said lower mold part and extending over said clearances at opposite sides, elongated horizontally-extending upper-mold-part-lifting elements normally disposed beneath said turntable in alignment with said clearances, respectively, actuator means operable to lift said lifting elements upwardly through said opening past said lower mold part into contact with the bottom of said upper mold part to raise same into a cooperative relationship with said mold-filling-and-emptying means whereby a molded article disposed in said upper mold is dislodged and dropped onto said lower mold part on the turntable, clamping means for holding the upper mold part above the turntable while the upper-mold-part-lifting elements are retracted to position beneath the table top, molded-article-ejecting means actuable to sweep between the upper and lower mold parts through the path of travel of the upper-mold-part-lifting elements to move the molded article from atop the lower mold part and outwardly of the apparatus, a lower-mold-part-lifting element normally disposed beneath the turntable between the upper-mold-part-lifting elements, and actuator means operable to lift said lower-mold-part-lifting element upwardly through the turntable opening into contact with the lower mold part to raise same into contact with the upper mold part for closing the bottom of same for filling of the mold by said mold filling and emptying means and for lowering of the filled mold in toto onto the turntable over its opening following unclamping of the upper mold part.

3. In a molding apparatus, a turntable having a mold-disposition location, a mold filling means disposed above said turntable beneath which said location may become disposed by rotary movement of said turntable, a mold having a flat-upper-surface lower mold part normally resting on said turntable at said mold-disposition location and a cavity-containing upper mold part normally resting on said lower mold part as a molding enclosure, an upper-mold-part-lifting means normally disposed beneath the turntable so as to avoid interference with turntable rotation, and a lower-mold-part-lifting means normally similarly disposed, said mold parts, turntable and the two lifting means being so constructed and arranged that, when the mold-disposition location of the turntable is beneath the mold filling means, actuation of the upper-mold-part-lifting means will raise the upper mold part above the lower mold part for emptying such upper mold part onto said lower mold part and subsequent actuation of the lower-mold-part-lifting means will raise the lower mold part upwardly to close the bottom of the upper mold part for filling of the mold by said mold filling means.

4. In a molding apparatus, bottom-closing means defining a flat horizontal surface, a mold part having an open bottom cooperable with the aforesaid bottom-closing means for closure by said flat horizontal surface, filling means for filling said mold part with a moldable material while in bottom-closed cooperation with said bottom-closing means, and mold-emptying means including means for raising said mold part above said bottom-closing means to permit emptying of the molded contents of said mold part through its open bottom onto the flat horizontal surface of said bottom-closing means.

References Cited by the Examiner
UNITED STATES PATENTS

| | | | |
|---|---|---|---|
| 1,086,824 | 2/14 | Hewlett et al. | 22—49 XR |
| 1,674,387 | 6/28 | Campbell | 18—4 |
| 1,991,706 | 2/35 | Seabury | 18—20 |
| 2,047,209 | 7/36 | Lawlor | 22—48 XR |
| 2,259,465 | 10/41 | Hardy | 18—30 |
| 2,346,182 | 4/44 | Pattison | 22—34 |
| 2,443,594 | 6/48 | Boettler et al. | 219—10.65 |
| 2,547,275 | 4/51 | Lyon | 18—4 |
| 2,816,321 | 12/57 | Hutchcroft | 18—30 |
| 2,998,501 | 8/61 | Edberg et al. | 219—10.65 |
| 3,069,725 | 12/62 | Root | 18—20 XR |

WILLIAM J. STEPHENSON, *Primary Examiner.*